(12) United States Patent
Lim et al.

(10) Patent No.: US 9,487,403 B2
(45) Date of Patent: Nov. 8, 2016

(54) TITANIUM OXYNITRIDE HAVING TITANIUM DEFICIENCY-TYPE HALITE STRUCTURE

(71) Applicant: TMC CO., LTD., Chungcheongnam-do (KR)

(72) Inventors: Young Soo Lim, Seoul (KR); Won-Seon Seo, Seoul (KR)

(73) Assignee: TMC Co., LTD., Chungcheongnam-Do (KR)

( * ) Notice: Subject to any disclaimer, the term of this patent is extended or adjusted under 35 U.S.C. 154(b) by 0 days.

(21) Appl. No.: 14/441,014

(22) PCT Filed: Nov. 20, 2012

(86) PCT No.: PCT/KR2012/009829
§ 371 (c)(1),
(2) Date: May 6, 2015

(87) PCT Pub. No.: WO2014/073727
PCT Pub. Date: May 15, 2014

(65) Prior Publication Data
US 2015/0298973 A1    Oct. 22, 2015

(30) Foreign Application Priority Data

Nov. 6, 2012 (KR) ........................ 10-2012-0124593

(51) Int. Cl.
*C01G 23/00* (2006.01)
*C01B 21/082* (2006.01)
(Continued)

(52) U.S. Cl.
CPC ............ *C01B 21/0821* (2013.01); *B01J 27/24* (2013.01); *B01J 35/004* (2013.01); *C01G 23/00* (2013.01); *C01P 2002/32* (2013.01); *C01P 2002/72* (2013.01)

(58) Field of Classification Search
None
See application file for complete search history.

(56) References Cited

U.S. PATENT DOCUMENTS 5,188,908 A * 2/1993 Nishiyama ............ B23B 27/148
428/698
5,320,782 A * 6/1994 Okuda ..................... C08K 7/00
106/446

FOREIGN PATENT DOCUMENTS

JP      11-12115       1/1999
JP      2006-182627    7/2006
(Continued)

OTHER PUBLICATIONS

N-Doped Titanium Monoxide Nanoparticles with TiO Rock-salt structure, Low Energy Band Gap, and Visible Light Activity. Pardis Simon et al. CHem. Mater. 2010, 22, 3704-3711.*
(Continued)

*Primary Examiner* — Melvin C Mayes
*Assistant Examiner* — Colette Nguyen
(74) *Attorney, Agent, or Firm* — Miller, Matthias & Hull LLP (57) ABSTRACT

Provided are titanium oxynitride having a titanium deficiency-type halite structure ($Ti_{1-x}O_{1-y}N_y$, wherein x and y are real numbers), in which x representing a deficiency degree of titanium is greater than 0 and less than 1, and y representing an introduction degree of nitrogen is greater than 0 and less than 1, and a method of preparing the same. The titanium oxynitride having the titanium deficiency-type halite structure with an improved photocatalyst property in the visible wavelength region may be provided.

5 Claims, 6 Drawing Sheets (51) Int. Cl.
    *B01J 27/24*     (2006.01)
    *B01J 35/00*     (2006.01)

(56) References Cited

FOREIGN PATENT DOCUMENTS

| JP | 2009-534503 | | 9/2009 |
|---|---|---|---|
| KR | 10-2001-0095089 | | 11/2001 |
| KR | 10-2006-0112858 | | 11/2006 |
| KR | 10-0670944 | * | 1/2007 |
| KR | 10-2007-0103407 | | 10/2007 |

OTHER PUBLICATIONS

International Search Report for related Int'l Appln. No. PCT/KR2012/009829 dated May 14, 2013.

P. Simon, B. Pignon, B. Miao. S. Coste-Leconte, Y. Leconte, S. Marguet, P. Jegou, b. Bouchet-Fabre, C. Reynauld, N. Herlin-Boime, Chem. Mater. 2010,22, 3704.

Office Action from related Japanese Application No. 2015-540584; action received Oct. 21, 2015.

Legrand, et al; "Study of the Thermal Nitridation of Nanocrystalline Ti(OH)4 by X-ray and in Situ Neutron Powder Diffration"; The Journal of Physical Chemistry; 2012; pp. 9561-9567.

Tian, et al; Efficient visible light-induced degradation of phenol on N-doped anatase TiO2 with large surface area and high crystalllinity; 2010; Jan. 14, 2010; www.elsevier.com/locate/epsusc.

Yap, et al; "Bimodal N-doped P25-TiO2/AC composite: Preparation, characterization, physical stability, and synergistic adsorptive-solar photocatalytic removal of sulfamethazine"; Apr. 6, 2012; www.elsevier.com/locate/apcata.

\* cited by examiner

TITANIUM OXYNITRIDE HAVING TITANIUM DEFICIENCY-TYPE HALITE STRUCTURE

CROSS-REFERENCE TO RELATED APPLICATIONS

This application is a 35 USC §371 US National Stage patent application of International Patent Application No. PCT/KR2012/009829 filed on Nov. 20, 2012, which claims priority to Korean Patent Application No. 10-2012-0124593, filed on Nov. 6, 2012.

FIELD OF THE DISCLOSURE

The present invention relates to titanium oxynitride and a method of preparing the same, and more particularly, to titanium oxynitride having a titanium deficiency-type halite structure, which has an improved photocatalyst property in a visible wavelength region, and a method of preparing the same.

BACKGROUND OF THE DISCLOSURE

A semiconductor metal oxide, titanium dioxide ($TiO_2$), is very physicochemically stable, compared to other similar metal oxides, has a band gap energy of approximately 3.2 eV, and is widely applied in the fields of energy, environment, display, fiber and medicine.

Among forms of titanium oxide ($TiO_2$), a porous metal oxide having nanopores has a regular arrangement of pores and a large specific surface area, and thus exhibits an excellent physical property. Therefore, it is applied in various applications, for example, as a photocatalyst, an electrode for a dye-sensitive solar cell (DSSC), and a hydrogen electrode.

However, since the titanium dioxide ($TiO_2$), which is well known as a photocatalyst, has a band gap energy of 3 eV or more, the titanium dioxide ($TiO_2$) has a poor photocatalyst property in a visible wavelength region.

Meanwhile, titanium monoxide (TiO) has a band gap energy of approximately 2.0 eV and easily absorbs wavelengths in the visible wavelength region.

The titanium monoxide (TiO) may have a halite structure, and the titanium monoxide (TiO) having a halite structure is a material that is stable at 1250° C. or more and has a stable monoclinic system at room temperature. Thus, the titanium monoxide (TiO) having a halite structure is prepared by long-term maintenance at a high temperature and rapid cooling to room temperature. In addition, the titanium monoxide (TiO) having a halite structure may be prepared by performing laser ablation in distilled water, or through a non-equilibrium process such as mechanochemical synthesis using titanium (Ti) metal and titanium dioxide ($TiO_2$) or laser pyrolysis of a titanium precursor (titanium isopropoxide). However, this titanium monoxide (TiO) having a halite structure prepared through the non-equilibrium process performed by applying instantaneous energy has low stability.

SUMMARY OF THE DISCLOSURE

The present invention is directed to providing titanium oxynitride having a titanium deficiency-type halite structure, which has an improved photocatalyst property in a visible wavelength region, and a method of preparing the same.

One aspect of the present invention provides titanium oxynitride having a titanium deficiency-type halite structure ($Ti_{1-x}O_{1-y}N_y$, wherein x and y are real numbers), in which x representing a deficiency degree of titanium is greater than 0 and less than 1, and y representing an introduction degree of nitrogen is greater than 0 and less than 1.

In the titanium oxynitride having the titanium deficiency-type halite structure, a vacancy is formed at a titanium site in the halite structure according to the deficiency of titanium, and nitrogen is substituted for oxygen at an oxygen site in the halite structure by binding to titanium.

The titanium oxynitride having the titanium deficiency-type halite structure has a {111} cleavage plane.

The titanium oxynitride having the titanium deficiency-type halite structure consists of hollow nanoparticles, each of which has an empty inside.

An oxidation number of a titanium site in the halite structure is greater than +2 and less than +3, and an oxidation number of an oxygen site in the halite structure is greater than −3 and less than −2.

The titanium oxynitride having the titanium deficiency-type halite structure has a lower band gap energy than titanium dioxide ($TiO_2$).

Another aspect of the present invention provides a method of preparing titanium oxynitride having a titanium deficiency-type halite structure, which includes: charging titanium dioxide ($TiO_2$) into a furnace; heating the furnace and introducing a gas flow containing nitrogen into the furnace charged with the titanium dioxide ($TiO_2$); according to the reduction of the titanium dioxide ($TiO_2$), forming a vacancy at a titanium site in the halite structure due to the deficiency of titanium, substituting the nitrogen for oxygen at an oxygen site in the halite structure and binding the nitrogen to titanium; and obtaining titanium oxynitride by cooling the furnace. The obtained titanium oxynitride is titanium oxynitride having a titanium deficiency-type halite structure ($Ti_{1-x}O_{1-y}N_y$, wherein x and y are real numbers), in which x representing a deficiency degree of titanium is greater than 0 and less than 1, and y representing an introduction degree of nitrogen is greater than 0 and less than 1.

The inside of the furnace may be maintained at 600 to 1000° C. by the heating.

The gas containing nitrogen may consist of $NH_3$ or $N_2$, and may be supplied into the furnace at a flow rate of 0.01 to 10 cc/min.

In addition, the gas containing nitrogen may be a mixed gas of $NH_3$ and $N_2$, which is prepared by mixing $NH_3$ and $N_2$ in a volume ratio of 0.1 to 50:50 to 99.9, and supplied into the furnace at a flow rate of 0.01 to 10 cc/min.

According to the present invention, titanium oxynitride having a titanium deficiency-type halite structure, in which a photocatalyst property in a visible wavelength region is improved, can be prepared. The titanium oxynitride having the titanium deficiency-type halite structure prepared according to the present invention has a lower band gap energy than titanium dioxide ($TiO_2$), which is widely used as a photocatalyst or DSSCs, and can facilitate absorption of wavelengths in the visible wavelength region.

A method of preparing titanium oxynitride having a titanium deficiency-type halite structure according to the present invention has a simple process and high reproducibility.

DESCRIPTION

Titanium oxynitride having a titanium deficiency-type halite structure according to an exemplary embodiment of the present invention is titanium oxynitride having a titanium deficiency-type halite structure ($Ti_{1-x}O_{1-y}N_y$, wherein x and y are real numbers), in which x representing a deficiency degree of titanium is greater than 0 and less than 1, and y representing an introduction degree of nitrogen is greater than 0 and less than 1.

A method of preparing titanium oxynitride having a titanium deficiency-type halite structure according to an exemplary embodiment of the present invention includes charging titanium dioxide ($TiO_2$) into a furnace; heating the furnace and introducing a gas flow containing nitrogen into the furnace charged with the titanium dioxide ($TiO_2$); according to the reduction of the titanium dioxide ($TiO_2$), according to the reduction of the titanium dioxide ($TiO_2$), forming a vacancy at a titanium site in the halite structure due to the deficiency of titanium, substituting the nitrogen for oxygen at an oxygen site in the halite structure and binding the nitrogen to titanium; and obtaining titanium oxynitride by cooling the furnace. The obtained titanium oxynitride is titanium oxynitride having a titanium deficiency-type halite structure ($Ti_{1-x}O_{1-y}N_y$, wherein x and y are real numbers), in which x representing a deficiency degree of titanium is greater than 0 and less than 1, and y representing an introduction degree of nitrogen is greater than 0 and less than 1.

Hereinafter, exemplary embodiments according to the present invention will be described in detail with respect to the accompanying drawings. However, the following embodiments are provided so that those of ordinary skill in the art fully understand the present invention, and may be modified in various other forms, and thus the scope of the present invention is not limited to the embodiments that will be described below.

Since titanium dioxide ($TiO_2$), which is well known as a photocatalyst has a band gap energy of approximately 3.2 eV, a photocatalyst property in the visible wavelength region is poor. To obtain a good photocatalyst property in the visible wavelength region, there have been attempts to reduce a band gap by forming a hybrid orbital of O 2p and N 2p by doping the titanium dioxide ($TiO_2$) with nitrogen (N). However, it is known that when the titanium dioxide ($TiO_2$) is doped with nitrogen (N), a problem in structural stability occurs.

Meanwhile, titanium (Ti), a transition metal, binds to oxygen, thereby forming various oxides, and the oxides may be, for example, titanium dioxide ($TiO_2$) or titanium monoxide (TiO), and may have a structure of $Ti_nO_{n+1}$ (n>1) known as a Magneli phase.

While the titanium dioxide ($TiO_2$) used as a photocatalyst or DSSC has a band gap energy of 3 eV or more, and a poor photocatalyst property in the visible wavelength region, the titanium monoxide (TiO) has a band gap energy of approximately 2.0 eV, which absorption of wavelengths in the visible wavelength region. The titanium monoxide (TiO) may have a halite structure and a lattice constant of 4.18 Å, which is very similar to that of titanium nitride (TiN) having a lattice constant of 4.24 Å. Accordingly, when nitrogen is introduced into the titanium monoxide having a halite structure (TiO), titanium oxynitride having a halite structure may be expected to form.

However, the titanium monoxide having a halite structure (TiO) is a stable material at 1250° C. or more, and since a monoclinic system is stable at room temperature, the titanium monoxide has been prepared by long-term maintenance at a high temperature, and rapid cooling at room temperature. In addition, the titanium monoxide having a halite structure (TiO) or nitrogen-introduced titanium monoxide having a halite structure may be prepared by performing laser ablation in distilled water, or through a non-equilibrium process such as mechanochemical synthesis using titanium (Ti) metal and titanium dioxide ($TiO_2$) or laser pyrolysis of a titanium precursor (titanium isopropoxide). However, this titanium monoxide (TiO) having a halite structure or the nitrogen-introduced titanium monoxide having a halite structure prepared through the non-equilibrium process performed by applying instantaneous energy has low stability. In one example, it was reported by Simon et al. that a nitrogen-introduced titanium monoxide having a halite structure was prepared through laser pyrolysis was prepared, and a photocatalyst property was measured for a short time of less than four minutes (P. Simon, B. Pignon, B. Miao, S. Coste-Leconte, Y. Leconte, S. Marguet, P. Jegou, B. Bouchet-Fabre, C. Reynaud, N. Herlin-Boime, Chem. Mater. 2010, 22, 3704.).

Titanium monoxide having a halite structure (TiO) prepared through an equilibrium process, rather than a non-equilibrium process, is not yet known, and particularly, the nitrogen-induced titanium deficiency-type titanium monoxide having a halite structure (TiO) is not yet known.

The present invention provides titanium oxynitride having a titanium deficiency-type halite structure ($Ti_{1-x}O_{1-y}N_y$, wherein 0<x<1, 0<y<1, and x and y are real numbers), which has an excellent photocatalyst property in the visible wavelength region, and a method of preparing the titanium oxynitride having the titanium deficiency-type halite structure by reducing titanium dioxide ($TiO_2$) in a gas atmosphere through heating. In the present invention, a thermal equilibrium process is used to prepare the titanium oxynitride having the titanium deficiency-type halite structure.

A formula of the titanium oxynitride having the titanium deficiency-type halite structure is $Ti_{1-x}O_{1-y}N_y$ (wherein x and y are real numbers), in which x representing a deficiency degree of titanium is greater than 0 and less than 1, and y representing an introduction degree of nitrogen is greater than 0 and less than 1.

The titanium oxynitride having a titanium deficiency-type halite structure is deficient in titanium and thus has a vacancy at a titanium site in the halite structure according to the amount by which titanium is deficient, and nitrogen binds to titanium and is substituted for oxygen at an oxygen site in the halite structure.

The titanium oxynitride having the titanium deficiency-type halite structure has a formula of $Ti_{1-x}O_{1-y}N_y$, in which x representing a deficiency degree of titanium is greater than 0 and less than 1 ($0<x<1$, wherein x is a real number). When the titanium oxynitride having the titanium deficiency-type halite structure is deficient in titanium, a vacancy is formed at the titanium site in the halite structure according to the amount by which titanium is deficient.

In addition, in the titanium oxynitride having the titanium deficiency-type halite structure, y representing an introduction degree of nitrogen is greater than 0 and less than 1 ($0<y<1$, wherein y is a real number). In the titanium oxynitride having the titanium deficiency-type halite structure, nitrogen binds to titanium and is substituted for oxygen at an oxygen site in the halite structure.

The titanium oxynitride having the titanium deficiency-type halite structure has a {111} cleavage plane, and consists of hollow nanoparticles, which are empty.

An oxidation number of a titanium site in the halite structure is greater than +2 and less than +3, and an oxidation number of an oxygen site in the halite structure is greater than −3 and less than −2.

Since the titanium oxynitride having the titanium deficiency-type halite structure has a lower band gap energy than the titanium dioxide ($TiO_2$), and easily absorbs wavelengths in the visible wavelength region, a photocatalyst property in the visible wavelength region is superior to that of titanium dioxide ($TiO_2$).

The titanium oxynitride having the titanium deficiency-type halite structure may be prepared by reducing titanium dioxide ($TiO_2$) in a gas atmosphere containing nitrogen by heating. The gas atmosphere containing nitrogen may be a single component gas containing $NH_3$, $N_2$, etc., or a mixed gas thereof.

Hereinafter, a method of preparing the titanium oxynitride having the titanium deficiency-type halite structure according to an exemplary embodiment of the present invention will be described in further detail.

The method of preparing the titanium oxynitride having a titanium deficiency-type halite structure according to an exemplary embodiment of the present invention includes charging titanium dioxide ($TiO_2$) into a furnace; heating the furnace and introducing a gas flow containing nitrogen into the furnace charged with the titanium dioxide ($TiO_2$); forming a vacancy at a titanium site in the halite structure due to the deficiency of titanium, substituting the nitrogen for oxygen at an oxygen site in the halite structure and binding the nitrogen to titanium according to the reduction of the titanium dioxide ($TiO_2$); and obtaining titanium oxynitride by cooling the furnace. The obtained titanium oxynitride is titanium oxynitride having a titanium deficiency-type halite structure ($Ti_{1-x}O_{1-y}N_y$, wherein x and y are real numbers), in which x representing a deficiency degree of titanium is greater than 0 and less than 1, and y representing an introduction degree of nitrogen is greater than 0 and less than 1.

The inside of the furnace may be maintained at 600 to 1000° C. by the heating. When a temperature in the furnace is too low, sufficient thermal energy may not be provided to the process in which nitrogen penetrates into titanium dioxide ($TiO_2$), binds to titanium, and is substituted for oxygen at an oxygen site. When the temperature of the furnace is too high, high thermal energy is consumed, which is not economical. The heating may be performed for a sufficiently long time for nitrogen to penetrate into titanium dioxide ($TiO_2$) and bind to titanium for oxygen at an oxygen site, for example, 1 to 72 hours. When the heating time is too short, nitrogen may not sufficiently penetrate into titanium dioxide ($TiO_2$), and insufficient substitution for oxygen at an oxygen site may occur. When the heating time is too long, the heating takes too long, which is uneconomical and less productive.

The gas containing nitrogen may consist of $NH_3$ or $N_2$, and may be supplied into the furnace at a flow rate of 0.01 to 10 cc/min.

In addition, the gas containing nitrogen may be a mixed gas of $NH_3$ and $N_2$, and the mixed gas may be a gas prepared by mixing $NH_3$ and $N_2$ in a volume ratio of 0.1 to 50:50 to 99.9, and the mixed gas may be supplied into the furnace at a flow rate of 0.01 to 10 cc/min.

Hereinafter, examples according to the present invention will be described in detail, but the present invention is not limited to the following examples.

Example 1

A P25 product manufactured by Degussa (Germany) was prepared as titanium dioxide ($TiO_2$).

Titanium oxynitride having a titanium deficiency-type halite structure was prepared by charging the prepared titanium dioxide ($TiO_2$) into a tube furnace, heating the charged titanium dioxide ($TiO_2$) at 800° C. for 9 hours while the flow of a mixed gas of $NH_3$ and $N_2$ (a gas in which $NH_3$ and $N_2$ were mixed in a volume ratio of 10:90) was introduced into the tube furnace, and naturally cooling the heated titanium dioxide ($TiO_2$). A temperature of the tube was raised to 800° C. at a rate of 3° C./min, and the mixed gas of $NH_3$ and $N_2$ was supplied into the tube furnace at a flow rate of 0.2 cc/min.

Figure 1:
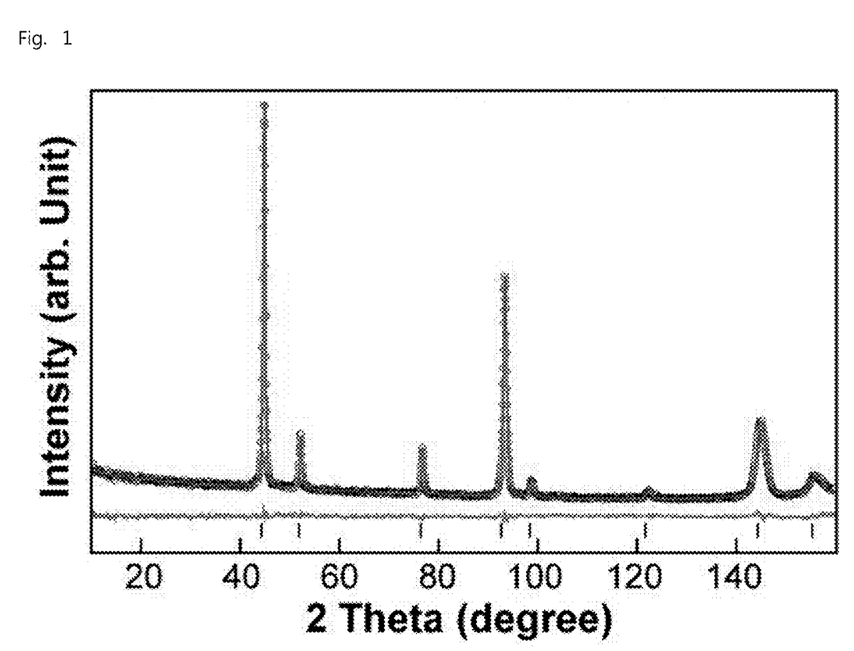
FIG. 1 shows a neutron diffraction analysis result for determining a structure and components of titanium oxynitride having a titanium deficiency-type halite structure prepared according to Example 1.

Neutron diffraction analysis was performed to determine a structure and components of the titanium oxynitride having the titanium deficiency-type halite structure prepared according to Example 1, and the result is shown in FIG. 1.

Referring to FIG. 1, the structure of the titanium oxynitride having the titanium deficiency-type halite structure was analyzed through Rietveld analysis for denoting the diffraction pattern represented by a figure of "o" with a line, and the result is summarized in Table 1 below.

TABLE 1

| Element | x position | y position | z position | Occupancy probability (occupancy) |
|---------|------------|------------|------------|-----------------------------------|
| Ti | 0.5 | 0.5 | 0.5 | 0.70 |
| O | 0 | 0 | 0 | 0.67 |
| N | 0 | 0 | 0 | 0.33 |

As a result, it was determined that a composition of the titanium oxynitride having the titanium deficiency-type halite structure realized according to Example 1 was $Ti_{0.7}(O_{0.67}N_{0.33})_1$. In addition, it was determined that 30% of titanium sites in the halite structure were vacant, 67% of oxygen sites in the halite structure were occupied by oxygen, and 33% of oxygen sites were occupied by nitrogen.

Figure 2:
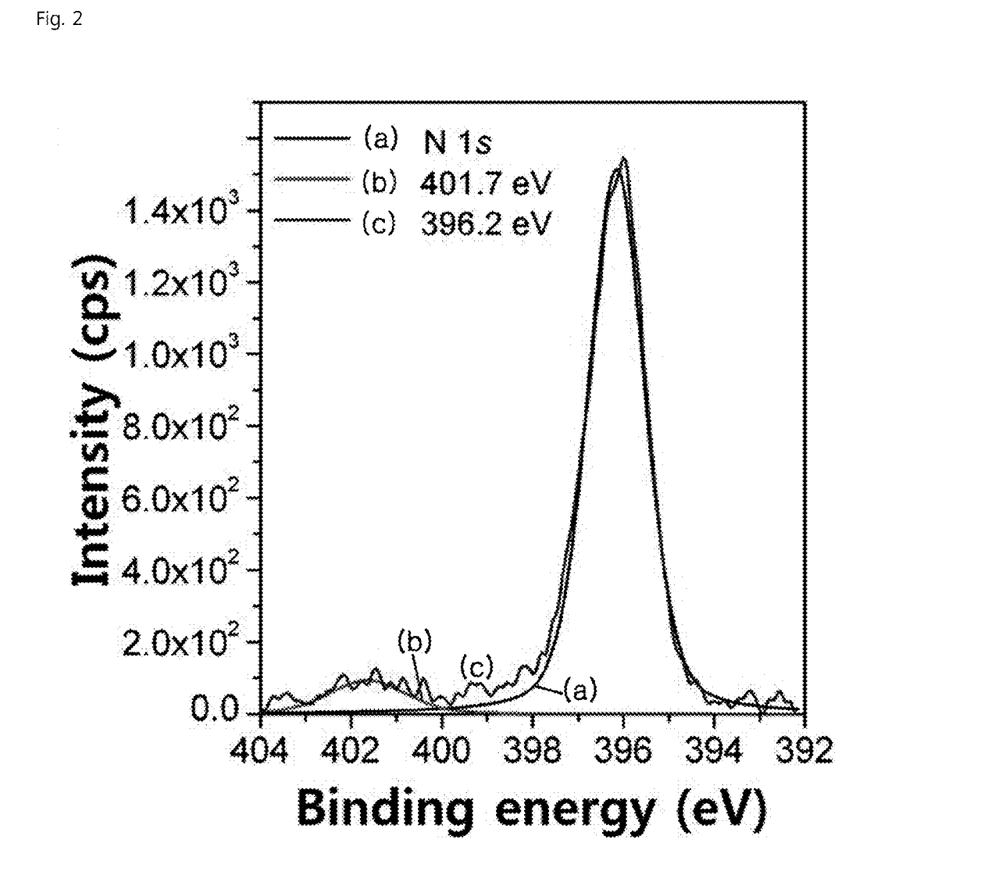
FIGS. 2 and 3 show X-ray photoelectron spectroscopy (XPS) results for determining binding between atoms in the titanium oxynitride having the titanium deficiency-type halite structure prepared according to Example 1.
Figure 3:
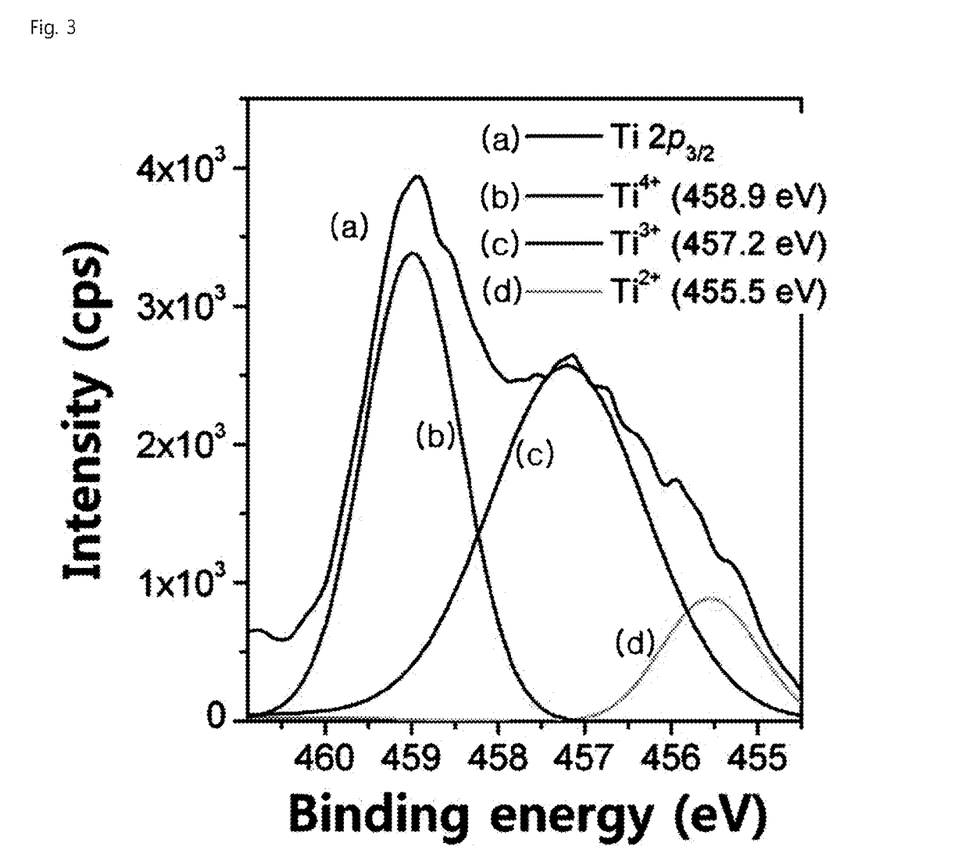

X-ray photoelectron spectroscopy (XPS) was performed to determine binding between atoms in the oxynitride having the titanium deficiency-type halite structure prepared according to Example 1, and the results are shown in FIGS. 2 and 3.

Referring to FIGS. 2 and 3, most (>90%) of the detected nitrogen binds to Ti as shown in FIG. 2, and a peak detected at 396.2 eV is shown. A weak peak observed at 401.7 eV represents a nitrogen component adsorbed on a surface of a sample. $Ti^{2+}$. $Ti^{3+}$ peaks shown in FIG. 3 show that titanium was successfully reduced. A ratio of $Ti^{2+}:Ti^{3+}:Ti^{4+}$ detected in FIG. 3 was 10.5%:50.5%:39.0%.

Summarizing the neutron diffraction result (refer to FIG. 1 and Table 1) and the XPS result (refer to FIGS. 2 and 3), an oxidation number of titanium sites in the halite structure, 70% of which were occupied by titanium ($Ti^{2+}$, $Ti^{3+}$, $Ti^{4+}$), is (+)2.3 ($\approx 0.7\times[(Ti^{+2})\times 0.105+(Ti^{+3})\times 0.505+(Ti^{+4})\times 0.390]$). In addition, it is noted that an oxidation number of oxygen sites in the halite structure, 67% of which were occupied by oxygen ($O^{2-}$) and 33% of which were occupied by nitrogen ($N^{3-}$), is (−)2.3 ($\approx 0.67\times(O^{2-})+0.33\times(N^{3-})$), and the oxidation numbers of the titanium sites and the oxygen sites in the halite structure are offset each other well. This shows that, in the formation of the titanium oxynitride having the halite structure, the titanium vacancy and the substitution of nitrogen play important roles in terms of structural stability. Accordingly, the above results show that, unlike titanium oxynitride having a halite structure prepared through a conventional non-equilibrium reaction, the titanium oxynitride having the titanium deficiency-type halite structure described in Example 1 is prepared under an equilibrium condition through a high temperature process and thus has a stable structure.

Figure 4:
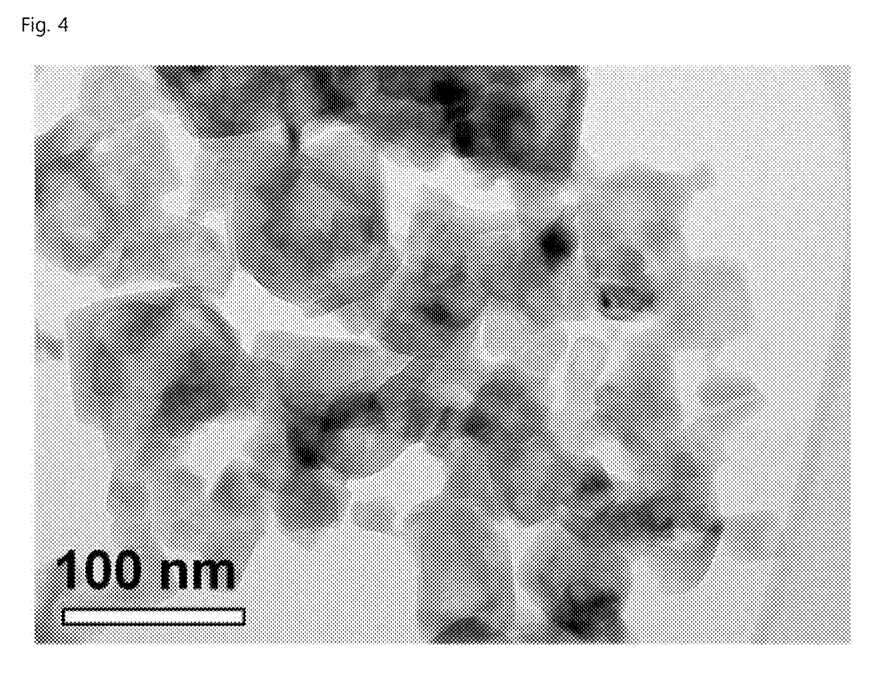
FIG. 4 shows a transmission electron microscope (TEM) image of the titanium oxynitride having the titanium deficiency-type halite structure prepared according to Example 1.

FIG. 4 shows a transmission electron microscope (TEM) image of the oxynitride having a titanium deficiency-type halite structure prepared according to Example 1.

Referring to FIG. 4, it is shown that the titanium oxynitride having the titanium deficiency-type halite structure was prepared of hollow nanoparticles which are empty.

Figure 5:
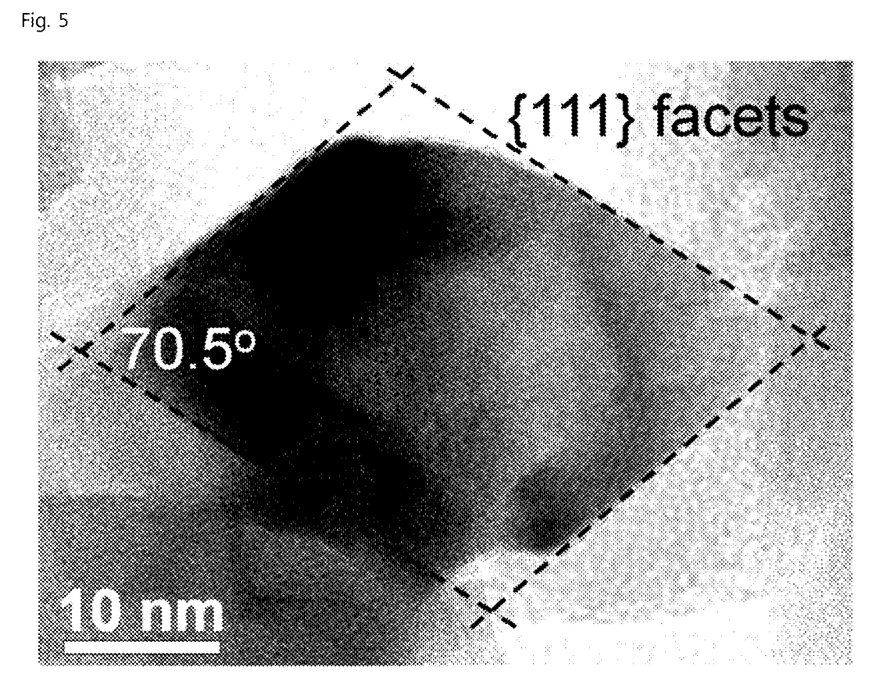
FIG. 5 shows a high resolution TEM image of the titanium oxynitride having the titanium deficiency-type halite structure prepared according to Example 1.

FIG. 5 shows a high resolution TEM image of the titanium oxynitride having the titanium deficiency-type halite structure prepared according to Example 1.

Referring to FIG. 5, it is shown that, even with the halite structure, the titanium oxynitride prepared according to Example 1 has a {111} cleavage plane. Generally, since {111} facets have polarity in the halite structure in which ion bonds are predominant, they have high surface energy, and thus the cleavage plane is formed on non-polar {001} facets like a salt crystal. However, the titanium oxynitride having the titanium deficiency-type halite structure realized in Example 1 has a {111} cleavage plane, which means that a covalent bond property according to the introduction of nitrogen is reinforced.

Figure 6:
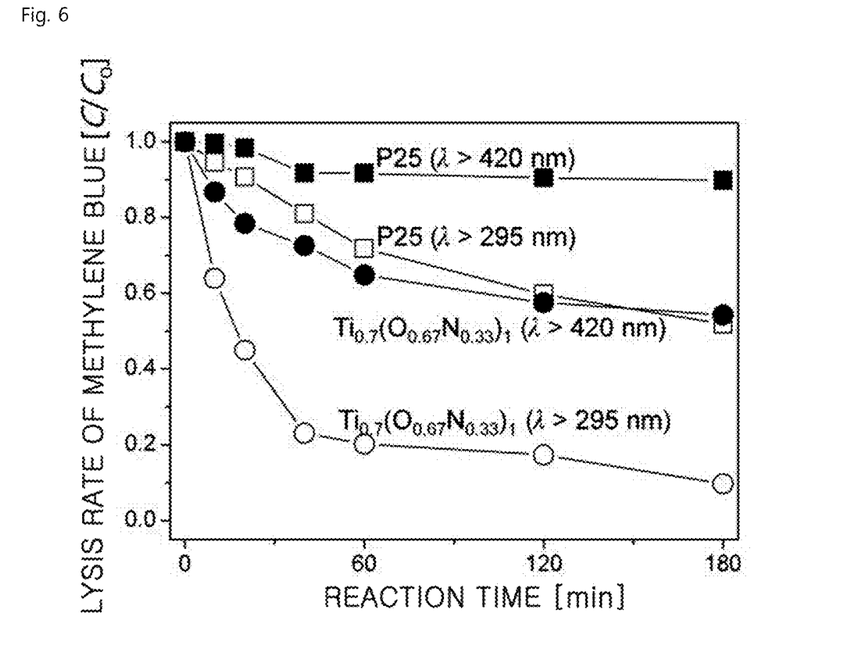
FIG. 6 shows a graph showing a photolysis property of methylene blue for determining a photocatalyst property of the titanium oxynitride having the titanium deficiency-type halite structure prepared according to Example 1.

FIG. 6 shows a graph showing a photolysis property of methylene blue to determine a photocatalyst property of the titanium oxynitride having the titanium deficiency-type halite structure prepared according to Example 1. To measure a photolysis property of methylene blue, as a conventional method, a 300 W xenon (Xe) arc lamp, a 295 nm cut-off filter, and a 420 nm cut-off filter were used.

Referring to FIG. 6, a study of comparing a representative photocatalyst to P25 manufactured by Degussa (Germany) with the titanium oxynitride having the titanium deficiency-type halite structure ($Ti_{0.7}(O_{0.67}N_{0.33})_1$) prepared according to Example 1 was performed, and the titanium oxynitride having the titanium deficiency-type halite structure prepared according to Example 1 showed excellent properties at wavelengths (>420 nm) in a visible wavelength region, as well as wavelengths (>290 nm) in a ultraviolet-visible wavelength region, compared to P25. This shows that a band gap of the titanium oxynitride having the titanium deficiency-type halite structure is suitable for absorbing wavelengths in the visible wavelength region. Although Simon et al. reported a result of the photolysis of trace amounts (1 μmol/L) of methylene blue within 4 minutes using titanium oxynitride having a halite structure prepared through a non-equilibrium reaction (P. Simon, B. Pignon, B. Miao, S. Coste-Leconte, Y. Leconte, S. Marguet, P. Jegou, B. Bouchet-Fabre, C. Reynaud, N. Herlin-Boime, Chem. Mater. 2010, 22, 3704.), it was determined that, in the case of the titanium oxynitride having the titanium deficiency-type halite structure prepared through an equilibrium reaction according to Example 1, a 100 times that concentration (100 μmol/L) of methylene blue was continuously photolyzed for 3 hours, and the titanium oxynitride having the titanium deficiency-type halite structure prepared through an equilibrium reaction according to Example 1 showed an excellent photocatalyst property and a high structural stability.

Figure 7:
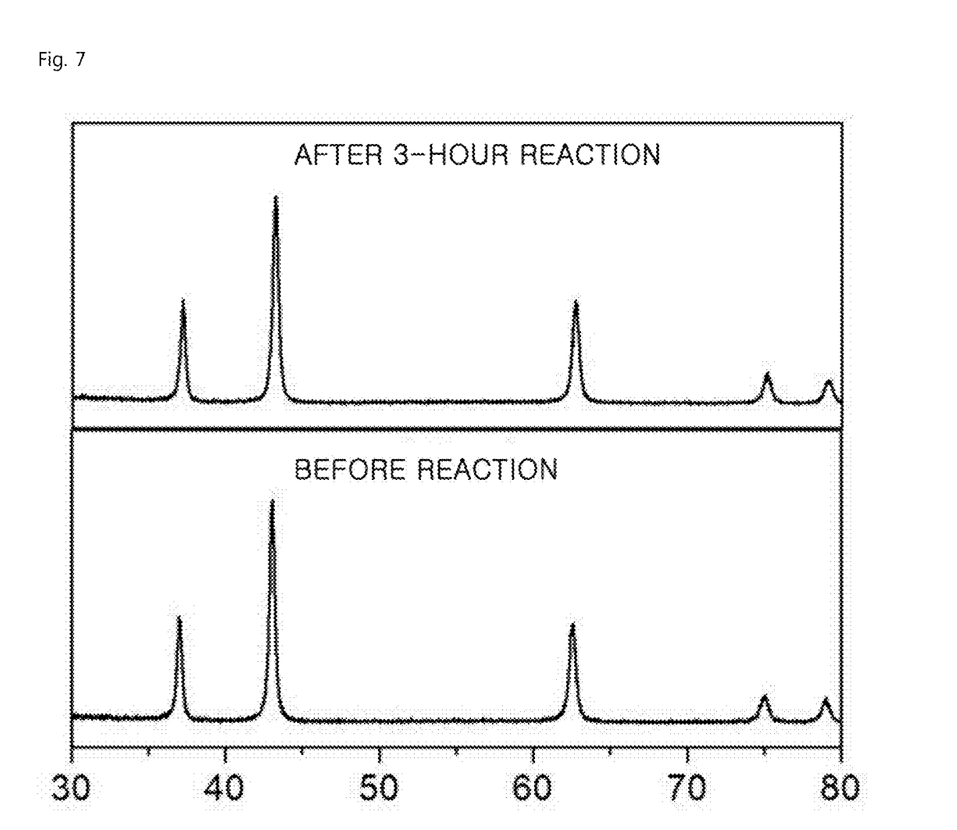
FIG. 7 shows XRD results for titanium oxynitrides having titanium deficiency-type halite structures before and after 3-hour photolysis.

FIG. 7 shows XRD results for titanium oxynitrides having titanium deficiency-type halite structures before and after 3-hour photolysis.

Referring to FIG. 7, after the 3-hour photolysis, the same X-ray diffraction pattern as that before photolysis was shown. This means that the titanium oxynitride having the titanium deficiency-type halite structure prepared according to Example 1 has excellent structural stability.

Although exemplary embodiments of the present invention have been described in detail above, the present invention is not limited to these, and can be modified in various forms within the scope of the technical idea of the present invention by those of ordinary skill in the art.

INDUSTRIAL APPLICABILITY

The present invention can provide titanium oxynitride having a titanium deficiency-type halite structure, which has an improved photocatalyst property in a visible wavelength region, and thus is industrially applicable.

The invention claimed is:

1. Titanium oxynitride having a titanium deficiency-type halite structure ($Ti_{1-x}O_{1-y}N_y$, in which x and y are real numbers),
   wherein x representing a deficiency degree of titanium is greater than 0 and less than 1, and y representing an introduction degree of nitrogen is greater than 0 and less than 1,
   wherein an oxidation number of the titanium site in the halite structure is greater than +2 and less than +3, and an oxidation number of the oxygen site in the halite structure is greater than −3 and less than −2.

2. The titanium oxynitride according to claim 1, wherein a vacancy is formed at a titanium site in the halite structure according to the amount by which titanium is deficient, and nitrogen is substituted for oxygen at an oxygen site in the halite structure by binding to titanium.

3. The titanium oxynitride according to claim 1, which includes a {111} cleavage plane.

4. The titanium oxynitride according to claim 1, which consists of hollow nanoparticles that are empty inside.

5. The titanium oxynitride according to claim 1, which has a lower band gap energy than titanium dioxide ($TiO_2$).

* * * * *